United States Patent
Anakkot et al.

(10) Patent No.: US 9,806,961 B2
(45) Date of Patent: Oct. 31, 2017

(54) METHOD AND APPARATUS FOR MANAGING SUBSCRIPTIONS FOR A SUBSCRIPTION-NOTIFICATION SERVICE

(71) Applicant: MOTOROLA SOLUTIONS, INC, Schaumburg, IL (US)

(72) Inventors: Anees Abdulkader Anakkot, Kerala (IN); Satyanarayana Tummalapenta, Karnataka (IN); Steven E. Vanswol, Lombard, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 151 days.

(21) Appl. No.: 14/587,023

(22) Filed: Dec. 31, 2014

(65) Prior Publication Data

US 2016/0191340 A1    Jun. 30, 2016

(51) Int. Cl.
  *G06F 15/173* (2006.01)
  *H04L 12/24* (2006.01)
  *H04L 29/08* (2006.01)

(52) U.S. Cl.
  CPC .............. *H04L 41/50* (2013.01); *H04L 67/24* (2013.01)

(58) Field of Classification Search
  CPC ................................ H04L 41/50; H04L 67/24
  USPC ......................................................... 709/223
  See application file for complete search history.

(56) References Cited

U.S. PATENT DOCUMENTS

| | | | |
|---|---|---|---|
| 6,021,262 A | 2/2000 | Cote et al. | |
| 8,060,572 B2 | 11/2011 | Brown et al. | |
| 8,311,521 B1 | 11/2012 | Paczkowski et al. | |
| 8,433,795 B2 | 4/2013 | Wang et al. | |
| 8,589,496 B2 | 11/2013 | Boberg et al. | |
| 9,374,328 B1* | 6/2016 | Kempen | H04L 67/24 |
| 9,456,080 B2* | 9/2016 | Moon | H04L 29/06027 |
| 2002/0116485 A1 | 8/2002 | Black et al. | |

(Continued)

FOREIGN PATENT DOCUMENTS

| | | |
|---|---|---|
| EP | 1746765 A2 | 1/2007 |
| EP | 2051479 A1 | 4/2009 |
| EP | 2222057 A1 | 8/2010 |

OTHER PUBLICATIONS

The International Search Report and the Written Opinion, SN: PCT/US2015/064935, filed: Dec. 10, 2015, mailed: Mar. 24, 2016, all pages.

*Primary Examiner* — S M Rahman

(57) ABSTRACT

A method and Subscription Service Host Server that support a presence service receives multiple subscription requests associated with multiple of subscribers, wherein each subscription request of the multiple subscription requests comprises a request to subscribe to presence information of a status publication source. In response to receiving the multiple subscription requests, a subscription is created for each subscriber of the multiple subscribers. A system condition is monitored and, based on the monitored system condition, a determination is made to suspend a subscription of a subscriber of the multiple subscribers. The subscription of the subscriber is placed into a suspended state to produce a suspended subscription, wherein the Server suspends the subscription without receiving, from the subscriber, a request to suspend the subscription. Subsequent to placing the subscription into a suspended state, a determination is made to one of reactivate and terminate the suspended subscription.

12 Claims, 3 Drawing Sheets

(56) References Cited

U.S. PATENT DOCUMENTS

| | | | |
|---|---|---|---|
| 2007/0105589 A1* | 5/2007 | Lu | H04W 88/02 455/556.2 |
| 2007/0182541 A1 | 8/2007 | Harris et al. | |
| 2009/0234927 A1 | 9/2009 | Buzescu | |
| 2009/0319655 A1* | 12/2009 | Viamonte Sole | H04L 67/24 709/224 |
| 2010/0077038 A1 | 3/2010 | Boberg et al. | |
| 2010/0217615 A1 | 8/2010 | Brown et al. | |
| 2011/0092159 A1* | 4/2011 | Park | H04L 63/102 455/41.2 |
| 2014/0068091 A1 | 3/2014 | T. et al. | |

* cited by examiner

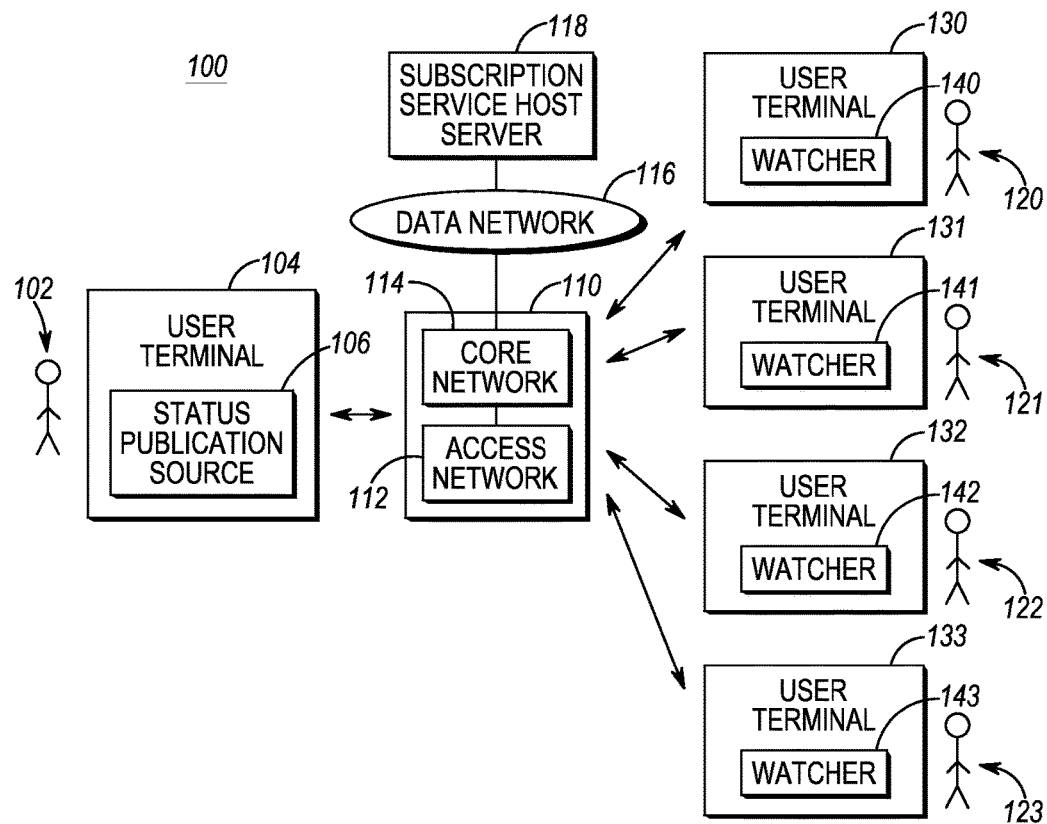
FIG. 1
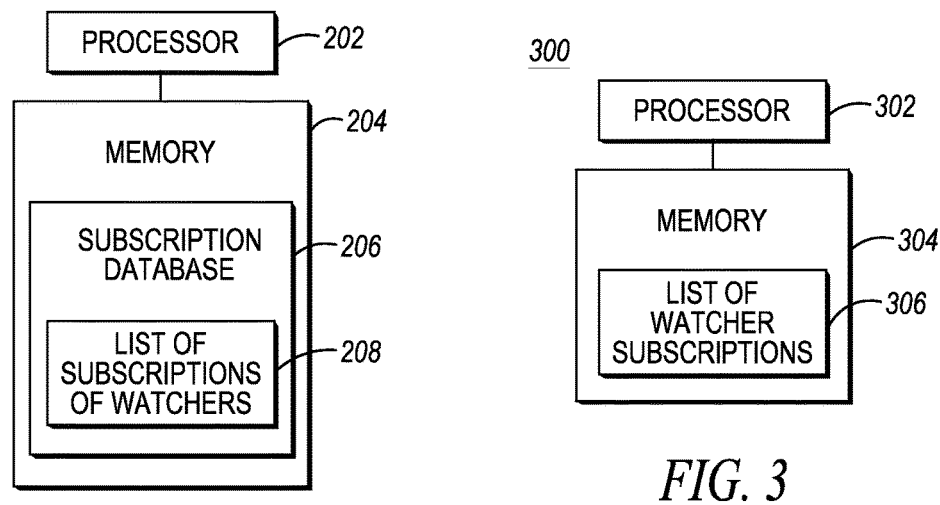
FIG. 2
FIG. 3

METHOD AND APPARATUS FOR MANAGING SUBSCRIPTIONS FOR A SUBSCRIPTION-NOTIFICATION SERVICE

FIELD OF THE INVENTION

The present invention relates generally to packet data communication systems, and more particularly to provision of a Subscription-Notification Service, such as a Presence Service, in a packet data communication system.

BACKGROUND OF THE INVENTION

In a presence network, such as the presence service proposed by the Open Mobile Alliance (OMA) standards or a Parlay X-based network, a presence entity, such as a Presentity in an OMA-based system, is a logical entity associated with a Presence User (for example, representing a human or a communication device) that has presence information associated with it. A Presence Source associated with the presence entity provides presence information about the presence entity to a Presence Server, and a Watcher requests presence information about the presence entity from the Presence Server. For example, in an OMA-based system, a Presence Source, implemented in a communication device operated by a first Presence User, may publish presence information to the Presence Server by conveying a Session Initiation Protocol SIP (Session Initiation Protocol) PUBLISH message comprising the presence information to the Presence Server. The presence information includes a current state of user status attributes associated with the presence entity, such as Presence Information Elements in an OMA-based system, for example, a location, an availability, a willingness, a mood, an activity, and so on. The Presence Server then stores the current state of the user status attributes in association with the presence entity. In addition, the Presence Server maintains a profile in association with each presence entity, which profile may include access rules that determine which set of Watchers are authorized to see presence information associated with the presence entity.

A second Presence User may wish to know a state of presence information associated with the first Presence User. In order to be informed of the presence information, a Watcher implemented in a second communication device associated with the second Presence User creates a subscription at the Presence Server to watch the first Presence User and/or to watch a group of Presence Users (also called a 'Resource List'). For example, in an OMA-based system, the Watcher may request to watch by conveying a SIP SUBSCRIBE message to the Presence Server requesting presence information associated with the watched entity (that is, the first User) or group of watched entities (that is, the group of Presences Users). Each subscription has an expiry value associated with it, which expiry value can be requested by a Watcher but overridden by the Presence Server. Prior to the expiration of the expiry value, the Watcher needs to refresh the subscription in order to prevent the subscription from lapsing.

In subscribing to watch a presence entity/group of watched entities, the Watcher may request notification concerning all user status attributes associated with each such presence entity, or may request notification concerning only select user status attributes. If the Watcher is authorized by the Presence Server, for example, by the access rules associated with a presence entity, the Watcher is then provided with a current state of each requested user status attribute, for example, via a SIP NOTIFY message in an OMA-based system.

A Presence Source associated with a presence entity then publishes a presence information update to the Presence Server every time a state of one or more user status attributes changes, regardless of the user status attributes watched by the Watcher/second Presence User. When the Presence Server receives the presence information update, the Presence Server forwards the update to the Watchers that have subscribed to that user status attribute of that presence entity.

Scenarios exist where some subscriptions hosted by a Presence Server need to be terminated, at least temporarily. Once such subscriptions are terminated, clients, for example, Watchers, will keep retrying to re-subscribe at pre-determined intervals or will stop trying altogether. The repeated attempts at re-subscription causes subscription requests to hit the Presence Server periodically, which the Presence Server may continue to reject, resulting in a waste of server resources. Further, the repeated attempts at re-subscription consume user terminal battery life and, where a number of terminated subscriptions is high, could congest a system.

BRIEF DESCRIPTION OF THE DRAWINGS

FIG. 1 is a block diagram of a communication system in accordance with an embodiment of the present invention.

FIG. 2 is a block diagram of a user terminal of FIG. 1 in accordance with an embodiment of the present invention.

FIG. 3 is a block diagram of a Subscription Service Host Server of FIG. 1 in accordance with an embodiment of the present invention.

Figure 4A:
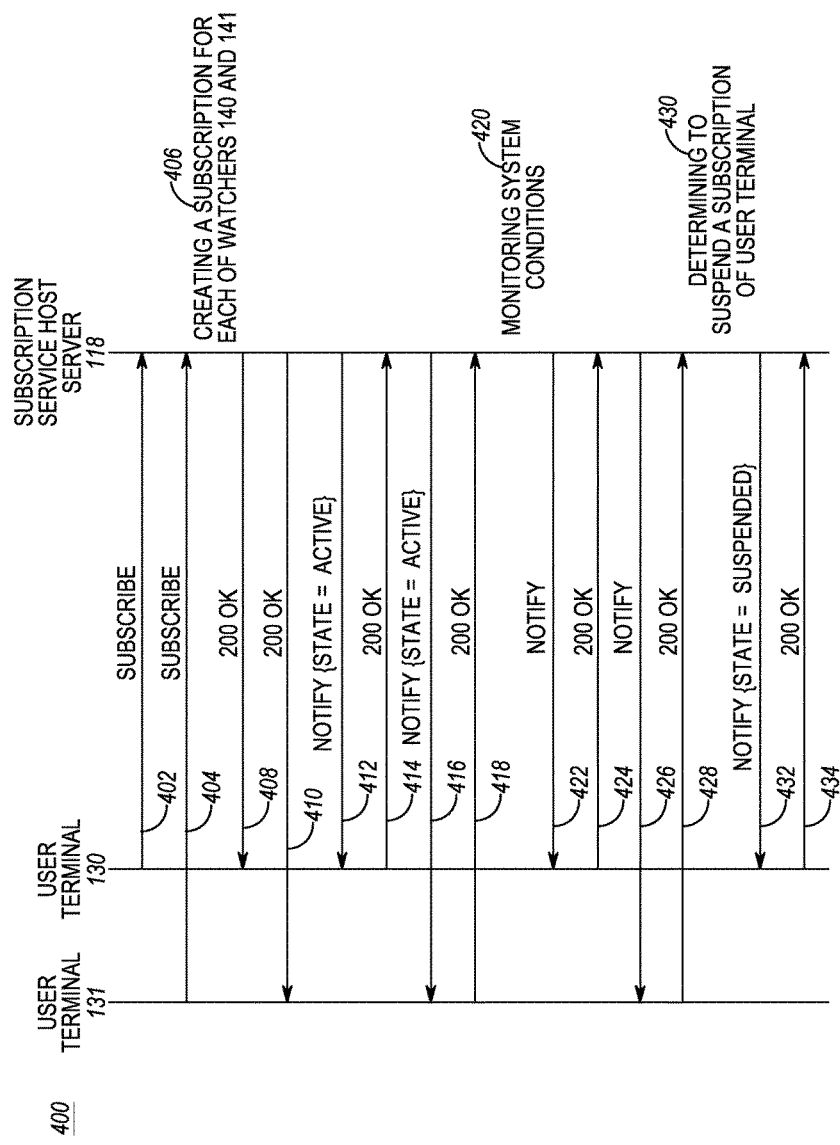
FIG. 4A is a signal flow diagram illustrating a method executed by the communication system of FIG. 1 to suspend Subscription-Notification Service subscriptions in accordance with various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in

DETAILED DESCRIPTION OF THE INVENTION

A method and Subscription Service Host Server that support a presence service are provided, wherein the method/Subscription Service Host Server receives multiple subscription requests associated with multiple of subscribers, wherein each subscription request of the multiple subscription requests comprises a request to subscribe to presence information of a status publication source. In response to receiving the multiple subscription requests, a subscription is created for each subscriber of the multiple subscribers. A system condition is monitored and, based on the monitored system condition, a determination is made to suspend a subscription of a subscriber of the multiple subscribers. The subscription of the subscriber is placed into a suspended state to produce a suspended subscription, wherein the Server suspends the subscription without receiving, from the subscriber, a request to suspend the subscription. Subsequent to placing the subscription into a suspended state, a determination is made to one of reactivate and terminate the suspended subscription.

Generally, an embodiment of the present invention encompasses a method for determining managing a presence service. The method includes receiving, at a Subscription Service Host server, multiple subscription requests associated with a plurality of subscribers, wherein each subscription request of the multiple subscription requests comprises a request to subscribe to presence information of a status publication source. In response to receiving the multiple subscription requests, creating a subscription is created for each subscriber of the multiple subscribers. A system condition is monitored and the Subscription Service Host Server, based on the monitored system condition, determines to suspend a subscription of a subscriber of the multiple subscribers. The Subscription Service Host Server places the subscription of the subscriber into a suspended state to produce a suspended subscription, wherein the Presence Server suspends the subscription without receiving, from the subscriber, a request to suspend the subscription, and subsequent to placing the subscription into a suspended state, the Subscription Service Host server determines to one of reactivate and terminate the suspended subscription.

Another embodiment of the present invention encompasses a Subscription Service Host Server configured to support a presence service. The Subscription Service Host Server includes a processor and an at least one memory device that is configured to maintain a plurality of subscriptions associated with a Watcher. The at least one memory device further is configured to store a set of instructions that, when executed by the processor, cause the processor to perform the following functions: receive a plurality of subscription requests associated with a plurality of subscribers, wherein each subscription request of the plurality of subscription requests comprises a request to subscribe to presence information of a status publication source; in response to receiving the plurality of subscription requests, create a subscription for each subscriber of the plurality of subscribers; monitor a system condition; determine, based on the monitored system condition, to suspend a subscription of a subscriber of the plurality of subscribers; place the subscription of the subscriber into a suspended state to produce a suspended subscription, wherein the Presence Server suspends the subscription without receiving, from the subscriber, a request to suspend the subscription; and subsequent to placing the subscription into a suspended state, determine to one of reactivate and terminate the suspended subscription.

The present invention may be more fully described with reference to FIGS. 1-4B. FIG. 1 is a block diagram of a communication system 100 that implements a Subscription-Notification Service in accordance with an embodiment of the present invention. Communication system 100 includes multiple Users 102 and 120-123 (five shown), such as Users in a presence service, that are each associated with a respective user terminal 104, 130-133, such as but not limited to a wireless mobile device, for example, a cellular telephone, a radio telephone, a personal digital assistant (PDA) with radio frequency (RF) capabilities, or a wireless modem that provides RF access to digital terminal equipment (DTE) such as a laptop computer, or a wireline device, such as but not limited to a wireline telephone, a personal computer (PC), a laptop computer, or other digital terminal equipment (DTE) that may interface to a wireline network. Each User 102, 120-123 subscribes to a subscription-notification service, such as a Presence Service, offered by communication system 100. Further, two or more of Users 102 and 120-123 may be members of a same talkgroup. As used herein, a subscription-notification service is a service wherein a user of the system, such as Users 102 and 120-123, subscribes to receive notifications of a user status, or state, of another user of the system, for example, periodically or whenever such state may change.

Communication system 100 further includes Subscription Service Host Server 118, for example, a Presence Server, which Subscription Service Host Server may be accessed by each of user terminals 104 and 130-133. For example, Subscription Service Host Server 118 may be coupled to a data network 116, such as an Internet Protocol network, and may be accessed by a wireline user terminal (not shown) via a wireline connection to the data network or by a wireless user terminal, such as user terminals 104 and 130-133, via a wireless communication network 110 that is, in turn, connected to the data network. Wireless communication network 110 includes one or more access networks 112 (one shown) that are each in communication with a core network 114, and, via the core network, with Subscription Service Host Server 118. In turn, each of the one or more access networks 112 provides wireless services to user terminals, such as user terminals 104 and 130-133, residing in a coverage area of the one or more access networks via a corresponding air interface that includes an uplink having one or more uplink traffic channels and one or more uplink signaling channels, and a downlink having one or more downlink traffic channels and one or more downlink signaling channels.

User 102 is associated with a watched entity (that is, a logical entity that has status information associated with it), such as a Presentity in a presence service, and other Users, such as Users 120-123, may subscribe to, and be notified of, user status information associated with the watched entity. User terminal 102 implements a Status Publication Source 106, such as a Presence Source in a presence service, that publishes user status information associated with the watched entity corresponding to the associated User 102. User terminals 130-133 each implements a respective Watcher 140-143 that may subscribe to user status information, that is, one or more user status attributes, such as a location, an availability, a willingness, a mood, an activity, and so on, associated with the watched entity associated with Status Publication Source 106. For example, User 130, and more particularly Watcher 140 (and similarly Users 131-133 and Watchers 141-143), may create a first subscription at a Subscription Service Host Server 110 to watch a watched entity associated with User 102, a second subscription to watch a second watched entity associated with a second User (not shown), and a third subscription to watch a group of watched entities associated with a group of Users (also called a 'Resource List').

In subscribing to the user status information associated with User 102/Status Publication Source 106, Watcher 140 may indicate which user status attributes to include or exclude in notifications, and/or that indicates triggers to send a notification, for example, when a particular user status attribute changes from or to a specified value.

As used herein, a Status Publication Source is a logical entity that provides user status information associated with a watched entity to a Subscription Service Host Server, such as Subscription Service Host Server 118, and a Watcher is a logical entity that requests user status information from the Subscription Service Host Server. User terminal 104 may or may not be associated with a watched entity and may or may not implement a Status Publication Source. Also, as used herein, a watched entity is a logical entity that has user status information associated with it and may be, for example, a person, a communication device, a role, such as a help desk, or a resource, such as a conference room.

Referring now to FIG. 2, a block diagram of Subscription Service Host Server 118 is provided in accordance with various embodiments of the present invention. Subscription Service Host Server 118 includes a processor 202, such as one or more microprocessors, microcontrollers, digital signal processors (DSPs), combinations thereof or such other devices known to those having ordinary skill in the art. The particular operations/functions of processor 202, and thus of the Subscription Service Host server, are determined by an execution of software instructions and routines that are maintained in a respective at least one memory device 204 associated with the processor, such as random access memory (RAM), dynamic random access memory (DRAM), and/or read only memory (ROM) or equivalents thereof, that store data and programs that may be executed by the corresponding processor.

The at least one memory device 204 of Subscription Service Host Server 110 further maintains a subscription database 206 that includes a profile in association with each watched entity included in communication system 100, such as the watched entities associated with User 102, which profile includes a set of policies associated with the watched entity, such as access rules that determine which watchers are authorized to see user status information associated with the watched entity, and content rules that determine which user status attributes a particular Watcher is authorized to see. Subscription database 206 further maintains user status information associated with each watched entity hosted by the Subscription Service Host Server and published by a Status Publication Source associated with each watched entity. In addition, subscription database 206 may further maintain filtering information such as a request by a Watcher to be notified only of particular user status attributes. In addition, at least one memory device 204 of Subscription Service Host Server 118 further maintains, for example, in database 206, for each Watcher served by the Subscription Service Host server, such as Watchers 140-143, a list of currently active subscriptions of the Watcher, that is, watched entities/Users currently being watched by the Watcher, for example, list 208 with respect to Watcher 140.

Referring now to FIG. 3, a block diagram of an exemplary user terminal 300, such as user terminals 104 and 130-133, is provided in accordance with various embodiments of the present invention. UE 300 includes a processor 302, such as one or more microprocessors, microcontrollers, digital signal processors (DSPs), combinations thereof or such other devices known to those having ordinary skill in the art. The particular operations/functions of processor 302, and respectively thus of user terminal 300, is determined by an execution of software instructions and routines that are stored in a respective at least one memory device 304 associated with the processor, such as random access memory (RAM), dynamic random access memory (DRAM), and/or read only memory (ROM) or equivalents thereof, that store data and programs that may be executed by the corresponding processor. At least one memory device further maintains a list of subscriptions 306 of a Watcher (such as Watchers 140-143) associated with the user terminal's associated User (such as Users 120-123 with respect to user terminals 130-133), to watch Users and/or groups of Users (also called a 'Resource List' (RLS)) associated with a Presence Service provided by Subscription Service Host Server 118.

When user terminal 200 implements one or more of a Status Publication Source, such as Status Publication Source 106, and/or a Watcher, such as Watchers 140-143, the one or more of the Status Publication Source and Watcher are implemented in an application layer of the processor 302 of the user terminal based on software instructions and routines that are stored in the respective at least one memory device 304 of the user terminal.

The embodiments of the present invention preferably are implemented within user terminals 104 and 130-133 and Subscription Service Host Server 118. More particularly, the functionality described herein as being performed by Subscription Service Host Server 118 is implemented with or in software programs and instructions stored in the respective at least one memory device 204 of the Subscription Service Host Server and executed by an associated processor 202 of the Subscription Service Host server. Further, the functionality described herein as being performed user terminals 104 and 130-133, for example, by Watchers 140-143 of user terminals 130-133 or by Status Publication Source 106 of user terminal 104, is implemented with or in software programs and instructions stored in a respective at least one memory device 304 of a corresponding user terminal and executed by an associated processor 302 of the user terminal. However, one of ordinary skill in the art realizes that the embodiments of the present invention alternatively may be implemented in hardware, for example, integrated circuits (ICs), application specific integrated circuits (ASICs), and the like, such as ASICs implemented in one or more of user terminals 104 and 130-133 and Subscription Service Host Server 118. Based on the present disclosure, one skilled in the art will be readily capable of producing and implementing such software and/or hardware without undo experimentation.

Communication system 100 may be any communication system implements a Subscription-Notification Service, wherein a user subscribes to a service that provides the user with notifications of a status, or a change in status, of another user. For example, in one embodiment of the present invention, communication system 100 may be a Presence Service that operates in accordance with, the Internet Engineering Task Force (IETF) and Open Mobile Alliance (OMA) specifications, such as OMA-RD-Presence_SIMPLE-V1_0-20051006-C, OMA-AD-Presence_SIMPLE-V1_0-

20051006-C, OMA-TS-Presence_SIMPLE-V1_0-20051222-C, and OMA-TS-Presence_SIMPLE_XDM-V1_0-20051222-C, and the IETF specifications referenced therein, including RFC (Request for Comments) 3856, RFC 3857, and RFC 3858, which specifications are hereby incorporated herein in their entirety. As described therein, a Presence Source, such as Status Publication Source 106, a Watcher, such as Watchers 140-143, and a Presence Server, such as Subscription Service Host Server 118, use Session Initiation Protocol (SIP)-type messaging to exchange presence-related information. In other embodiments of the present invention, communication system 100 may operate in accordance with the Parlay X specifications as jointly defined by the European Telecommunications Standards Institute (ETSI), the Parlay Group, and the Third Generation Partnership Project (3GPP) or in accordance with any other subscription-notification service known in the art.

When one or more of the multiple user terminals 104, 130-133 is a wireless mobile device, the user terminal may use any one of a variety of air interface technologies to transmit packet data over an associated air interface to Subscription Service Host Server 118. For example, communication system 100 may comprise one or more of a Code Division Multiple Access (CDMA) communication system, a Global System for Mobile communication (GSM) communication system, a Universal Mobile Telecommunication Service (UMTS) communication system, an Orthogonal Frequency Division Multiple Access (OFDM) communication system, or a Wireless Local Area Network (WLAN) communication system as described by the IEEE (Institute of Electrical and Electronics Engineers) 802.xx standards, for example, the 802.11a, 802.11g, 802.16, or 802.21 standards. As those who are of ordinary skill in the art realize, the type of presence service, and air interface, employed by communication system 100 is not critical to the present invention and communication system 100 may be any type of communication system that supports a subscription-notification service without departing from the spirit and scope of the present invention.

Figure 4B:
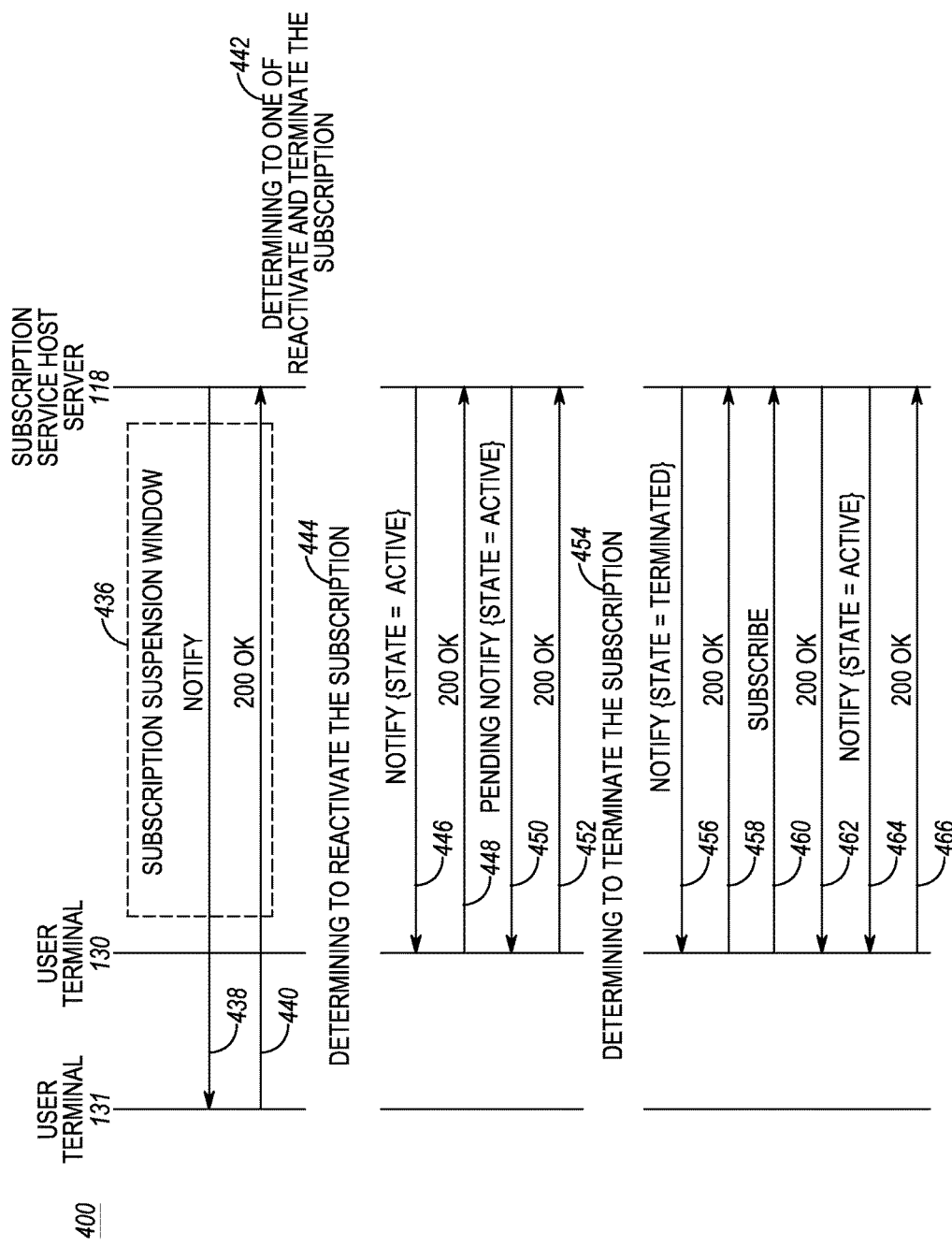
FIG. 4B is a continuation of the signal flow diagram of FIG. 4A illustrating a method executed by the communication system of FIG. 1 to suspend Subscription-Notification Service subscriptions in accordance with various embodiments of the present invention.

Referring now to FIGS. 4A and 4B, a signal flow diagram 400 is depicted that illustrates a method executed by communication system 100 to suspend Subscription-Notification Service subscriptions in accordance with various embodiments of the present invention Signal flow diagram 400 begins when each of multiple users, such as a first User 120 and a second User 121, and more particularly a first Watcher 140 of a first user terminal 130 associated with first User 120 and a second Watcher 141 of a second user terminal 131 associated with second User 121, establishes a connection with Subscription Service Host Server 118 in accordance with known techniques and creates a subscription at the Subscription Service Host Server to watch a User and/or a groups of Users (also called a 'Resource List' (RLS)). More particularly, each of the first and second Watchers 140, 141 conveys to Subscription Service Host Server 118, and the Subscription Service Host Server receives from the Watchers, a respective subscription message 402, 404, such as a SIP (Session Initiation Protocol) SUBSCRIBE message, wherein each subscription message requests user status information associated with a single watched entity (an "individual" subscription) or a group of watched entities (that is, the logical entities representing each User of a group of Presences Users) (a "group," or "RLS," subscription) identified by the message. For example, referring to FIG. 1, each of Watchers 140 and 141 conveys to Subscription Service Host 118 a subscription message requesting user status information associated with User 102. However, in other embodiments of the present invention, each of Watchers 140 and 141 may convey to Subscription Service Host Server 118 a subscription message requesting user status information associated with different Users.

Each subscription message may include a filter that specifies which user status attributes to include or exclude in notifications, and/or triggers to send a notification, for example when a particular user status attribute changes from or to a specified value. Each subscription message further may include an expiration value, which expiration value can be overridden by Subscription Service Host Server 118.

In response to receiving the subscription messages, Subscription Service Host Server 118 creates 406, and adds to a list of subscriptions 208 associated with each of Watchers 140 and 141 (or creates a subscription list 208 for a Watcher if none exists), a subscription to the watched entity, in this case a watched entity associated with User 102. Each subscription includes a subscription identifier that uniquely identifies the subscription relative to the other subscriptions in the list, such as one or more of a watched entity identifier and a subscription identifier, and further includes an expiry value, which expiry value may comprise the value conveyed by the Watcher to the Subscription Service Host Server or may be a value independently set by the Subscription Service Host server. Subscription Service Host Server 118 further acknowledges receipt of each of the subscription messages, and the creation of the corresponding subscription, by conveying a subscription confirmation message 408, 410, for example, a 200 OK message, to each of Watchers 140 and 141. Each of user terminals 130 and 131, and in particular Watchers 140 and 141, then adds the confirmed subscriptions to that Watcher's list of subscriptions 306 maintained by the at least one memory device 304 of the corresponding user terminal.

In response to creating the subscriptions, Subscription Service Host Server 118 notifies Watchers 140 and 141 of a state of an appropriate user status attribute by conveying, to the Watchers and for each Watcher's subscription, a user status information notification 412, 416, such as a SIP NOTIFY message wherein a state is set to 'active.' For example, Subscription Service Host Server 110 may return, in the notification, a current state of the user status attribute requested by the Watcher. In response to receiving the notifications, each Watcher 140, 141 acknowledges receipt of the notification, for example, by conveying an acknowledgment message 414, 418, such as a 200 OK message, to Subscription Service Host Server 118.

Subsequent to creating the subscriptions, User 102, and in particular Status Publication Source 106, publishes user status information updates, that is, updates of user status attributes, to Subscription Service Host Server 118, such as an update of a location, an availability, a willingness, a mood, an activity, and so on, associated with the watched entity corresponding to the User. For each subscription created by a Watcher 140, 141 and based on the received user status attribute updates, Subscription Service Host Server 118 stores updated user status information, that is, updated states of the user status attributes, in subscription database 206 of the Subscription Service Host server, and more particularly stores the updated user status information in association with each appropriate subscription in the list of subscriptions maintained by the Subscription Service Host Server in association with each Watcher 140, 141.

In addition, in response to receiving the user status information updates, Subscription Service Host Server 118 conveys a notification 422, 426 to each of Watchers 140, 141, such as a SIP NOTIFY message, notifying of the updated user status information, that is, of the updated states of the appropriate user status attributes. In various embodiments of the present invention, Subscription Service Host Server 118 may convey such notifications to Watchers 140 and 141 each time a watched entity subscribed to by the Watcher publishes a user status information update, or Subscription Service Host Server 118 may convey such notifications periodically or in response to receiving a predetermined number of user status information updates associated with a particular one or more subscriptions. In response to receiving each notification, each Watcher 140, 141 acknowledges receipt of the notification, for example, by conveying a notification acknowledgement 424, 428 such as a 200 OK message, to Subscription Service Host Server 118.

In the meanwhile, subsequent to creating the subscriptions for Watchers 140 and 141, Subscription Service Host Server 118 monitors 420 conditions of communication system 100. For example, the Subscription Service Host Server may monitor system loading, network traffic loading, and/or latency response times. Based on the monitored system conditions, Subscription Service Host Server 118 self-determines 430 to suspend one or more subscriptions, without receiving a request to suspend the one or more subscriptions.

For example, Subscription Service Host Server 118 may determine that one or more subscriptions should be suspended because communication system 100 is congested. Indications of congestion may be when the Subscription Service Host Server fails to receive acknowledgements of notifications sent to the user devices, or receives such notifications in a delayed fashion. For example, when a percentage of user terminals that fail to acknowledge notifications falls below an acknowledgement threshold, or a delay in a receipt of such acknowledgements (that is, a delay between transmitting a notification and receiving a corresponding acknowledgement) is greater than a delay threshold, that could indicate that network 110 is congested and could trigger a suspension of subscriptions by Subscription Service Host Server 118.

By way of other examples, Subscription Service Host Server 118 could determine that network 110 is congested based on receiving, from one or more of access network 112 and core network 114, indications of system congestion. For example, when an element, such as a gateway, of core network 114 determines that bearers are getting dropped, the gateway could determine an access network associated with the dropped bearers is congested and so inform Subscription Service Host Server 118. Or user terminal clients communicating with Subscription Service Host Server 118 may report their throughput, for example, Quality of Service (QoS)-related information, to a corresponding client of Subscription Service Host Server 118. Subscription Service Host Server 118 may compare the reported throughput for each user terminal served by access network 112, for example, user terminals 104 and 130-133, to a throughput threshold maintained in at least one memory device 204 of the Subscription Service Host Server, and when the reported throughput for a user terminal falls below the throughput threshold, the Subscription Service Host Server may conclude that the access network is congested and trigger a suspension of subscriptions by the Subscription Service Host Server. Or when a number of user terminals served by the access network is greater than the threshold number of user terminals, Subscription Service Host Server 118 may determine that an access network is congested and trigger a suspension of subscriptions by the Subscription Service Host Server.

In still other embodiments of the present invention, Subscription Service Host Server 118 may determine that it is unacceptably congested, for example, that its load exceeds a load threshold or that a number of subscriptions that are currently active exceeds a subscription threshold, and trigger a suspension of subscriptions by the Subscription Service Host Server.

Subsequent to creating the subscription for Watchers 140 and 141 and in response to self-determining to suspend one or more subscriptions, Subscription Service Host Server 118 then suspends, that is, places in a suspended state, a subscription of at least one of the multiple Watchers 140, 141. For example, in one embodiment of the present invention, Subscription Service Host Server 118 may determine to suspend, and correspondingly suspend, some but not all of the subscriptions of a Watcher, or may determine to suspend, and correspondingly suspend, subscriptions of some Watchers but not subscriptions of other Watchers. For example, Subscription Service Host Server 118 may determine to suspend, and correspondingly suspend, the subscription of first Watcher 140 but not suspend the subscription of second Watcher 141.

Subscription Service Host Server 118 may select a subscription to suspend, from among multiple subscriptions of a Watcher and/or from among subscriptions of multiple Watchers, based on a client (user terminal)-specified subscription prioritization or a Subscription Service Host server-specified subscription prioritization. For example, a client-specified subscription prioritization could be a Watcher/user terminal specifying subscription prioritization by indicating a priority of a particular subscription in a header of a corresponding subscribe message sent by the Watcher to Subscription Service Host Server 118. Or some client types may be of higher priority than other client types, which client type associated with a subscription could be indicated in a User-Agent header of a SIP message. Or certain of users 102, 120-123 may be higher priority users than other users, which information could be preprogrammed into Subscription Service Host Server 118. By way of further example, a server-specified subscription prioritization could be based on administrative polices programmed into the Subscription Service Host Server, such as content-based prioritization wherein user 'status' changes are of a higher priority than user 'location' changes or wherein user participation in some events is higher priority than user participation in other events.

In response to determining to place the subscription of Watcher 140 in a suspended state while maintaining an active state for the subscription of Watcher 141, Subscription Service Host Server 118 notifies Watcher 140 that the Watcher's subscription has been suspended by conveying a notification message 432 to Watcher 140. The notification message identifies the subscription(s) suspended and indicates that the subscription(s) have been put into a state of suspension. For example, the notification message may be a SIP NOTIFY message that identifies the subscription and that has a state set to 'suspended.'

Subscription Service Host Server 118 suspends, that is, maintains in a suspended state, the subscription of Watcher 140 for a duration of a subscription suspension time window 436. A length, in time, of subscription suspension time window 436 may be predetermined or may be dynamically determined based on the continued monitoring by Subscription Service Host Server 118 of the conditions of communication system 100. For example, when Subscription Service Host Server 118 determines that a determined congestion condition is acceptably relieved or diminished, the Subscription Service Host Server may determine that the subscription suspension time window has ended. During subscription suspension time window 436, Subscription Service Host Server 118 may continue to receive user status information updates from Status Publication Source 106 and may continue to convey notifications 438 of the updated user status information to Watcher 141, but does not convey notifications of the updated user status information to Watcher 140. As a result, Watcher 141 continues to receive and acknowledge 440 such notifications, but Watcher 140 neither receives nor acknowledges such notifications.

Subsequent to suspending the subscription of first Watcher 140, Subscription Service Host Server 118 determines 442 to one of reactivate and terminate the suspended subscription of Watcher 140. That is, in one embodiment of the present invention, subsequent to suspending the subscription of first Watcher 140, Subscription Service Host Server 118 may determine to reactivate 444 the suspended subscription of Watcher 140. In response to determining to reactivate the suspended subscription of Watcher 140, Subscription Service Host Server 118 notifies Watcher 140 that the Watcher's subscription has been reactivated. For example, Subscription Service Host Server 118 may convey, to Watcher 140, a notification 446 indicating the reactivation of the subscription, for example, by conveying a SIP NOTIFY message that identifies the subscription and with the state of the message set to 'reactivated' or simply to 'active.' By way of further example, such a notification may be a user status information notification that identifies the subscription and that indicates one or more of a current state, or a current state and one or more previous updates (for example, that occurred while the subscription was suspended), of a user status attribute that was being watched by Watcher 140. In response to receiving the notification, Watcher 140 acknowledges receipt of the notification, for example, by conveying an acknowledgment message 448 such as a 200 OK message, to Subscription Service Host Server 118. Further, Subscription Service Host Server 118 can resynchronize the state of the user status attribute by sending one or more pending notification indications 450, which pending notification indications are acknowledged 452 by Watcher 140 and are used by Watcher 140 to synchronize the state of the user status attribute maintained by the Watcher with the state of the attribute maintained by Subscription Service Host Server 118.

In another embodiment of the present invention, subsequent to suspending the subscription of first Watcher 140, Subscription Service Host Server 118 may determine to terminate 454 the suspended subscription of Watcher 140. For example, Subscription Service Host Server 118 may determine that it is unable to synchronize, with Watcher 140, the state of the user status attribute that was being watched by Watcher 140, As a result, Subscription Service Host Server 118 may determine to terminate the subscription in order to trigger, at Watcher 140, a new subscription to that attribute, thereby causing Watcher 140 to resynchronize with the Subscription Service Host server, In response to determining to terminate the suspended subscription of Watcher 140, Subscription Service Host Server 118 notifies Watcher 140 that the Watcher's subscription has been terminated. For example, Subscription Service Host Server 118 may convey, to Watcher 140, a notification 456 indicating the termination of the subscription, for example, by conveying a SIP NOTIFY message that identifies the subscription and with a state of the message set to 'terminated.' Watcher 140 acknowledges receipt of the notification, for example, by conveying an acknowledgment message 458, such as a 200 OK message, to Subscription Service Host Server 118. Further, Watcher 140 may or may not delete the terminated subscription from the Watcher's list of subscriptions 306 maintained by the corresponding user terminal 130.

Watcher 140 then may re-subscribe to the user status attribute by conveying to Subscription Service Host Server 118, and the Subscription Service Host Server receiving from the Watcher, a new subscription message 460, such as a SIP SUBSCRIBE message, requesting user status information associated with User 102. In response to receiving the new subscription message 460, Subscription Service Host Server 118 creates a corresponding subscription and acknowledges receipt the subscription message, and the creation of the subscription, by conveying a subscription confirmation message 462 to Watcher 140, for example, a 200 OK message. User terminal 130, and in particular Watcher 140, then may add the confirmed subscription to that Watcher's list of subscriptions 306 if the Watcher had previously deleted it. Further, in response to creating the subscription, Subscription Service Host Server 118 notifies Watcher 140 of a state of an appropriate user status attribute by conveying, to the Watcher and for the Watcher's subscription, a user status information notification 464, such as a SIP NOTIFY message wherein the state is set to 'active.' Watcher 140 acknowledges receipt of the notification, for example, by conveying an acknowledgment message 466, such as a 200 OK message, to Subscription Service Host Server 118. Signal flow diagram 400 then ends.

In various embodiments of the present invention, in the event that user terminal 130 associated with Watcher 140 has a Transmission Control Protocol (TCP) connection open with Subscription Service Host Server 118 prior to the suspension of the Watcher's subscription, the user terminal may maintain that connection during subscription suspension window 436. And in the event that user terminal 130 associated with Watcher 140 is using the User Datagram Protocol (UDP) to communicate with Subscription Service Host Server 118, corresponding network address translator (NAT) bindings may be maintained during subscription suspension window 436 by sending 'keep-alive' packets by the Subscription Service Host Server to the user terminal.

In the foregoing specification, specific embodiments have been described. However, one of ordinary skill in the art appreciates that various modifications and changes can be made without departing from the scope of the invention as set forth in the claims below. For example, while signal flow diagram 400 is described with respect to the suspension of a subscription of Watcher 140, in other embodiments of the present invention, Subscription Service Host Server 118 may receive subscriptions from, and suspend subscriptions of, multiple members of a talkgroup, for example, a talkgroup comprising Users 120-123. For example, Subscription Service Host Server 118 may receive subscriptions from Watchers 140-143 and subsequently suspend the subscriptions of Watchers 140 and 142, while maintaining the subscriptions of Watchers 141 and 143. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for managing a presence service comprising:
   receiving, at a Subscription Service Host server, a plurality of subscription requests associated with a plurality of subscribers, wherein each subscription request of the plurality of subscription requests comprises a request to subscribe to presence information of a status publication source;
   in response to receiving the plurality of subscription requests, creating a corresponding subscription to presence information for each subscriber of the plurality of subscribers;
   monitoring, by the Subscription Service Host server, a system condition;
   determining, by the Subscription Service Host Server and based on the monitored system condition indicating a system congestion condition, to at least temporarily suspend, but not delete, a particular subscription to presence information of a particular subscriber of the plurality of subscribers until the system congestion condition is relieved, and responsively;
   determining, by the Subscription Service Host Server, a priority associated with each subscriber of the plurality of subscribers;
   determining, by the Subscription Service Host Server, to suspend the particular subscription to presence information of the articular subscriber based on the priority associated with the particular subscriber being lower than a priority of another subscriber of the plurality of subscribers whose subscription is not suspended;
   placing, by the Subscription Service Host server, the particular subscription to presence information into a suspended state to produce a suspended subscription to presence information, wherein the Subscription Service Host Server suspends the particular subscription to presence information without receiving, from the particular subscriber, a request to suspend the particular subscription to presence information and without deleting the particular subscription to presence information; and subsequent to placing the particular subscription to presence information into the suspended state, determining, by the Subscription Service Host server, to one of reactivate and terminate the suspended particular subscription to presence information.

2. The method of claim 1, further comprising:
   in response to the determining to one of reactivate and terminate the suspended particular subscription to presence information, notifying, by the Subscription Service Host server, the particular subscriber associated with the suspended particular subscription to presence information that the particular subscriber's particular subscription to presence information has been respectively reactivated or terminated.

3. The method of claim 1, wherein the determining to one of reactivate and terminate the suspended particular subscription to presence information further comprises:
   determining whether the Subscription Service Host Server can re-synchronize the particular subscriber with a current status of the status publication source subscribed to by the particular subscriber; and
   determining to terminate and delete the suspended particular subscription to presence information when the Subscription Service Host Server cannot re-synchronize the particular subscriber with the current status of the status publication source subscribed to by the particular subscriber.

4. The method of claim 1, wherein the monitored system condition comprises a loading of the Subscription Service Host Server itself.

5. The method of claim 1, wherein the plurality of subscribers comprise members of a group and wherein determining to suspend the particular subscription to presence information of the particular subscriber of the plurality of subscribers further comprises determining to suspend a corresponding subscription to presence information of each of the members of the group without receiving, from any of the members of the group, a request to suspend a subscription to presence information.

6. The method of claim 1, further comprising the Subscription Service Host server transmitting an indication to the particular subscriber that the particular subscription to presence information has been suspended but not deleted.

7. A Subscription Service Host Server configured to support a presence service, the Subscription Service Host Server comprising: a processor; at least one memory device that is configured to maintain a plurality of subscriptions associated with a Watcher; and wherein the at least one memory device further is configured to store a set of instructions that, when executed by the processor, cause the processor to perform a set of Functions comprising:

receive a plurality of subscription requests associated with a plurality of subscribers, wherein each subscription request of the plurality of subscription requests comprises a request to subscribe to presence information of a status publication source;

in response to receiving the plurality of subscription requests, create a corresponding subscription to presence information for each subscriber of the plurality of subscribers;

monitor a system condition;

determine, based on the monitored system condition indicating a system congestion condition, to at least temporarily suspend, but not delete, a particular subscription to presence information of a particular subscriber of the plurality of subscribers until the system congestion condition is relieved, and responsively;

determine a priority associated with each subscriber of the plurality of subscribers;

determine to suspend the particular subscription to presence information of the particular subscriber based on the priority associated with the particular subscriber being lower than a priority of another subscriber of the plurality of subscribers whose subscription is not suspended;

place the particular subscription to presence information into a suspended state to produce a suspended subscription to presence information without receiving, from the particular subscriber, a request to suspend the particular subscription to presence information and without deleting the particular subscription to presence information; and subsequent to placing the particular subscription to presence information into the suspended state, determine to one of reactivate and terminate the suspended particular subscription to presence information.

8. The Subscription Service Host Server of claim 7, wherein the set of functions further comprise:

in response to the determining to one of reactivate and terminate the suspended particular subscription to presence information, notifying the particular subscriber associated with the suspended particular subscription to presence information that the particular subscriber's particular subscription to presence information has been respectively reactivated or terminated.

9. The Subscription Service Host Server of claim 7, wherein the set of functions further comprise determining to one of reactivate and terminate the suspended particular subscription to presence information by:

determining whether the Subscription Service Host Server can re-synchronize the particular subscriber with a current status of the status publication source subscribed to by the particular subscriber; and determining to terminate and delete the suspended particular subscription to presence information when the Subscription Service Host Server cannot re-synchronize the particular subscriber with the current status of the status publication source subscribed to by the particular subscriber.

10. The Subscription Service Host Server of claim 7, wherein the monitored system condition comprises a loading of the Subscription Service Host Server itself.

11. The Subscription Service Host Server of claim 7, wherein the plurality of subscribers comprise members of a group and wherein the set of functions further comprise determining to suspend the particular subscription to presence information of the particular subscriber of the plurality of subscribers by:

determining to suspend a corresponding subscription to presence information of each of the members of the group without receiving, from any of the members of the group, a request to suspend a subscription to presence information.

12. The Subscription Service Host Server of claim 7, wherein the set of functions further comprise transmitting an indication to the particular subscriber that the particular subscription to presence information has been suspended but not deleted.

\* \* \* \* \*